RE 25817

July 31, 1962  E. A. ROCKWELL  3,047,097
BRAKE CONSTRUCTION
Filed July 2, 1958  5 Sheets-Sheet 1

INVENTOR
Edward A. Rockwell
Carlson, Pitzer, Hubbard & Wolfe
ATTORNEY

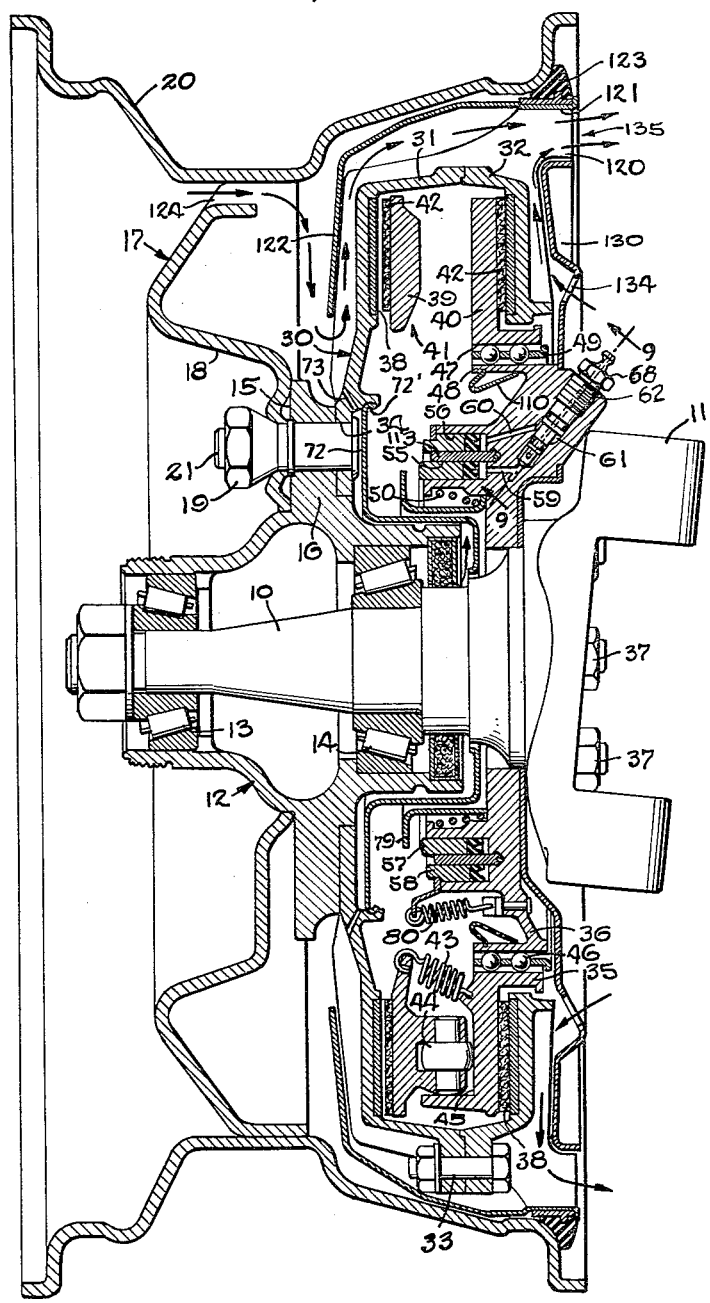

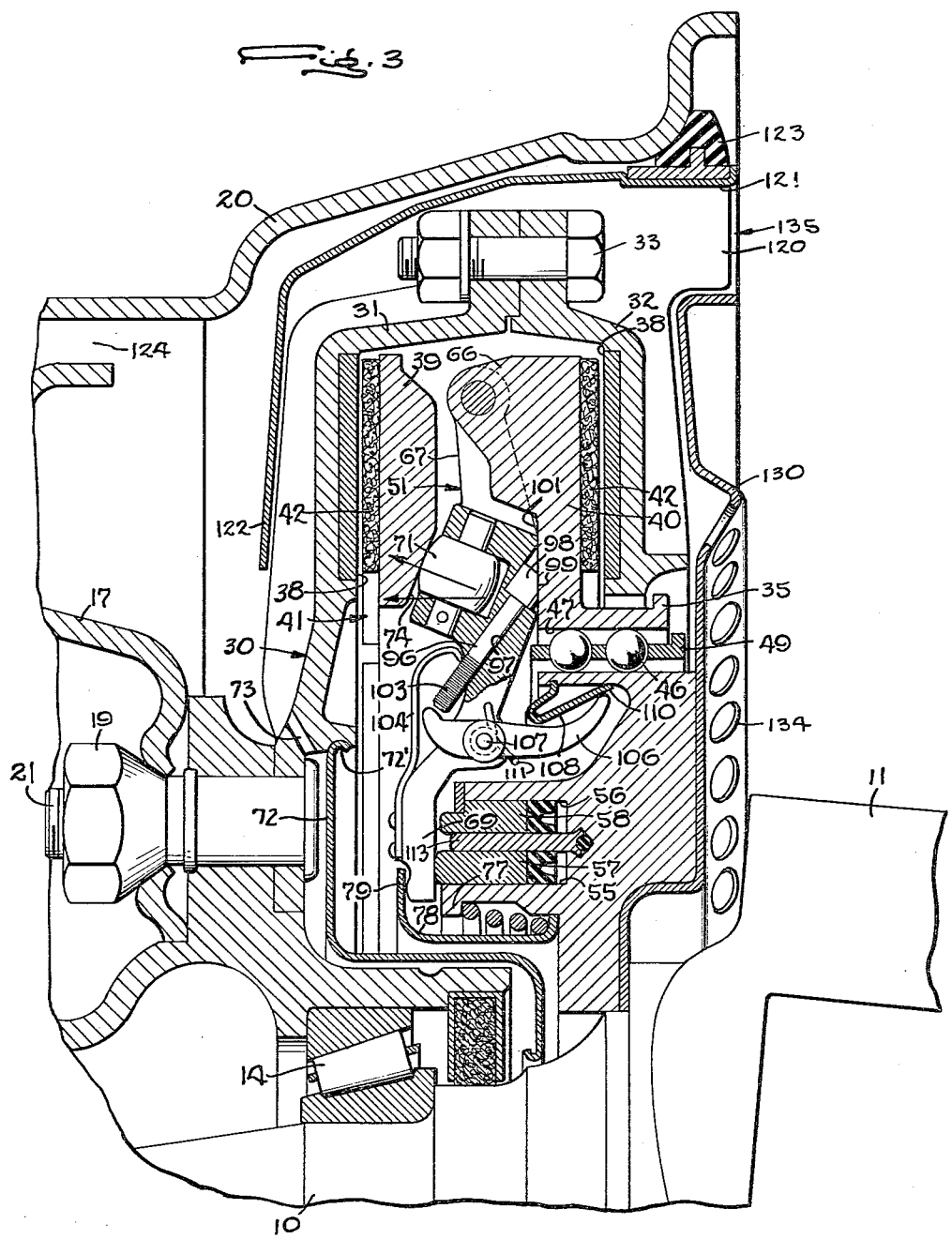

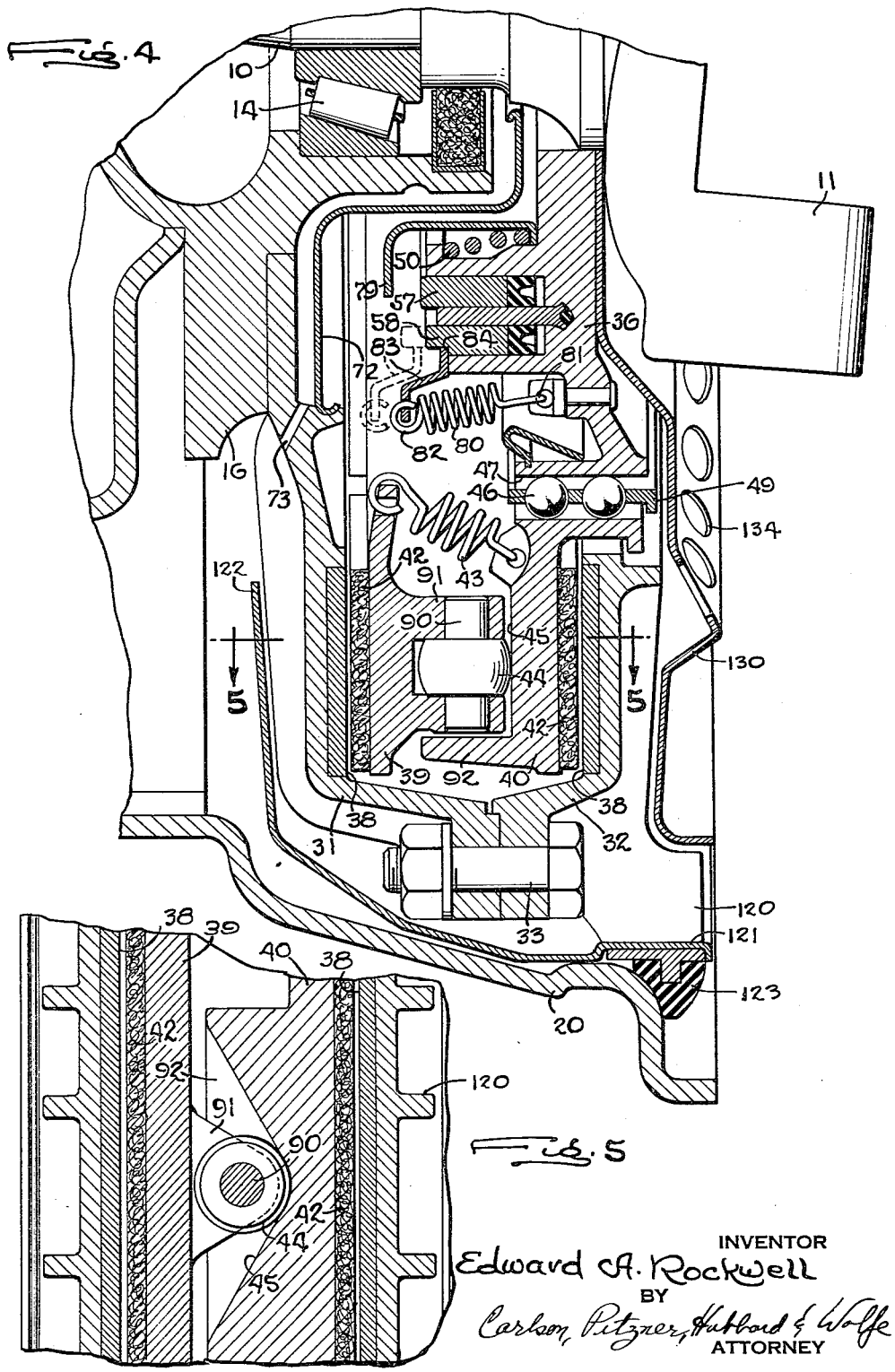

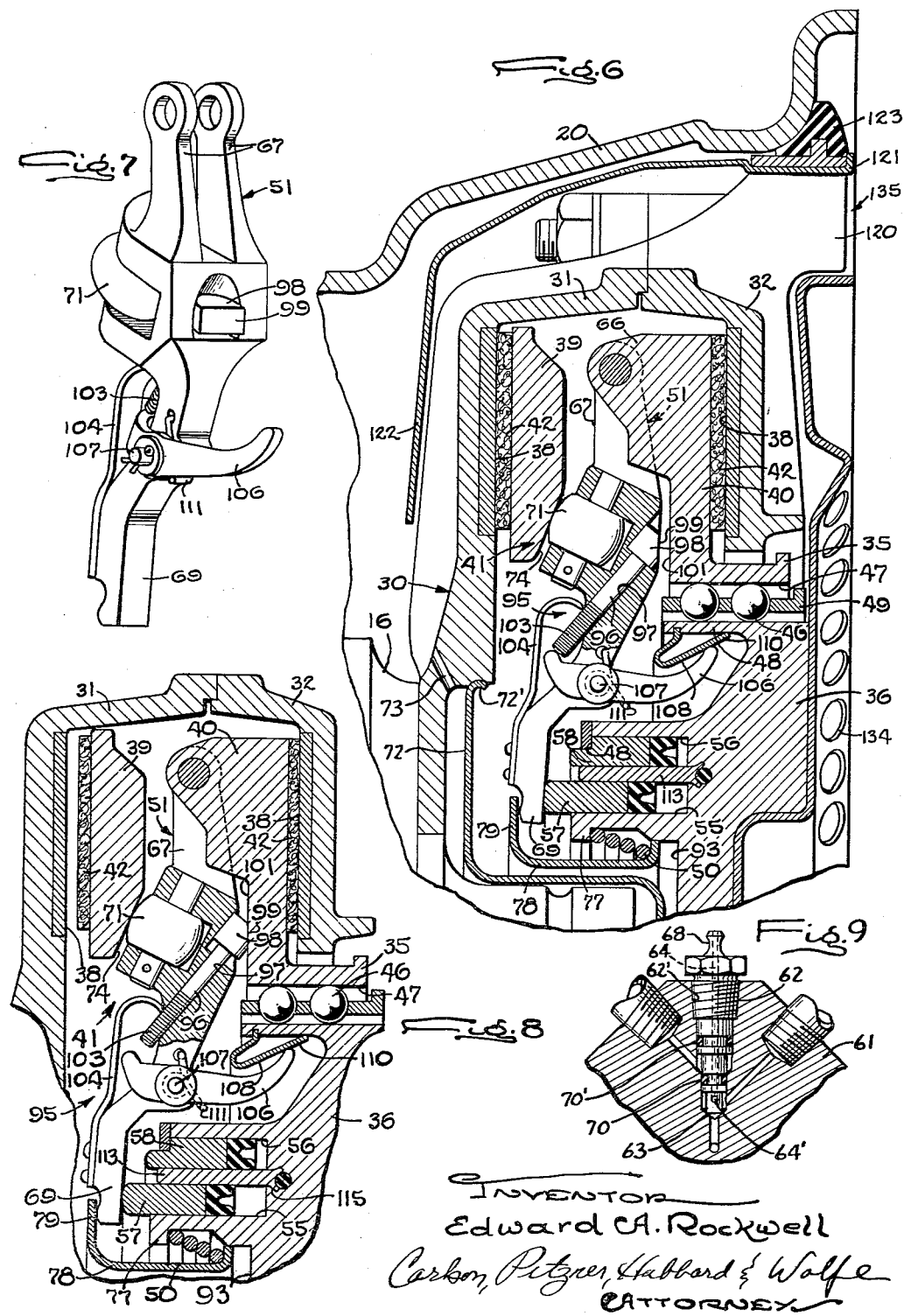

United States Patent Office 3,047,097
Patented July 31, 1962

3,047,097
BRAKE CONSTRUCTION
Edward A. Rockwell, 167 Ashdale Place,
Los Angeles 49, Calif.
Filed July 2, 1958, Ser. No. 746,292
17 Claims. (Cl. 188—72)

This invention relates to brake mechanisms for a rotary member and more particularly to a disk type of brake for a rotary wheel.

The present invention has particular but by no means exclusive utility as a brake for automobiles, trucks, buses, tractors, etc., where braking service is severe.

It is the primary object of the present invention to provide an improved brake mechanism of the disk type which is capable of providing high braking forces for extended periods of brake application with a minimum of fading or overheating. Another object is to provide a disk brake which requires light treadle pressure for initial actuation and which releases quickly and precisely in response to release of treadle pressure.

Another important object of this invention is to provide for automatic adjustment of the brake disks to compensate for brake lining wear. A related object of the foregoing is to provide a brake adjuster which controls the positions of the brake discs directly, and progressively alters the brake-released position of the same as lining wear occurs, to maintain a predetermined clearance between the brake lining and the coacting braking surfaces.

A further object of the invention is to provide a dual hydraulic system enabling both service and emergency brake operation hydraulically, and having means for simultaneously bleeding the lines.

Another object of the invention is to provide a direct "follow-through" connection from the treadle to the brake disks which gives the operator a sense of feel as the brakes are applied and released. A further object is to provide an easier acting brake with a short range pedal and requiring proportionately lower initial pressure. It is another object to provide a brake which an operator is less likely to lock in a "panic stop" or under hazardous road conditions, so that skids and loss of steering control are less likely with a vehicle equipped with the present invention, affording increased safety of operation for vehicles equipped therewith.

It is a further object of the invention to provide a self-energized brake which is extremely compact and which is adaptable for mounting on the hub portion of the small (fourteen inch) wheels used on modern motor cars. A related object is to provide for more efficent utilization of the available space within the brake housing to secure a larger area of braking surface for the same wheel size.

It is a related object to provide a novel brake mechanism which is constructed to occupy a small annular space totally enclosed within the wheel but which nevertheless provides an adequate cooling arrangement for dissipating heat generated during operation of the braking members. More specifically, it is an object to provide forced air cooling of the brake housing. Another object is to provide a structure capable of handling large volumes of cooling air through passages guiding the flow of air over the surfaces to be cooled, and having provision for shielding against the entry of dirt or other foreign materials such as water or mud thrown up from the road which would be likely to block the air passages.

It is also an object to provide a brake construction which is made up of a relatively few parts which are suited for manufacture in quantity at relatively low cost. It is another object to provide a brake which may be readily serviced so as to reduce maintenance difficulties and cost.

Other objects and advantages of the invention will become apparent upon reading the attached description and upon reference to the drawings, wherein:

FIG. 2 is a vertical section of the wheel and brake shown in FIGURE 1 taken substantially in the plane of lines 2—2 of FIGURE 1;

FIG. 3 is an enlarged fragmentary sectional view of a portion of the wheel and brake shown in FIGURE 1 and is taken substantially in the plane of lines 3—3 in FIGURE 1;

FIG. 4 is an enlarged fragmentary sectional view of the lower half of the wheel and brake shown in FIGURE 2;

FIG. 5 is an enlarged fragmentary sectional view taken substantially in the plane of lines 5—5 of FIG. 4, and shows the cam and roller;

FIG. 6 is an enlarged fragmentary sectional view taken in the manner of FIG. 3 and showing the brake when energized;

FIG. 7 is a perspective view of the pivotal brake lever showing, particularly, the adjuster for brake lining wear;

FIG. 8 is a fragmentary sectional view taken in the manner of FIG. 3 and showing the brake when de-energized with the brake adjuster in its position after material brake lining wear, and FIG. 9 is a fragmentary sectional view taken substantially in the plane of lines 9—9 of FIG. 2.

Figure 1:
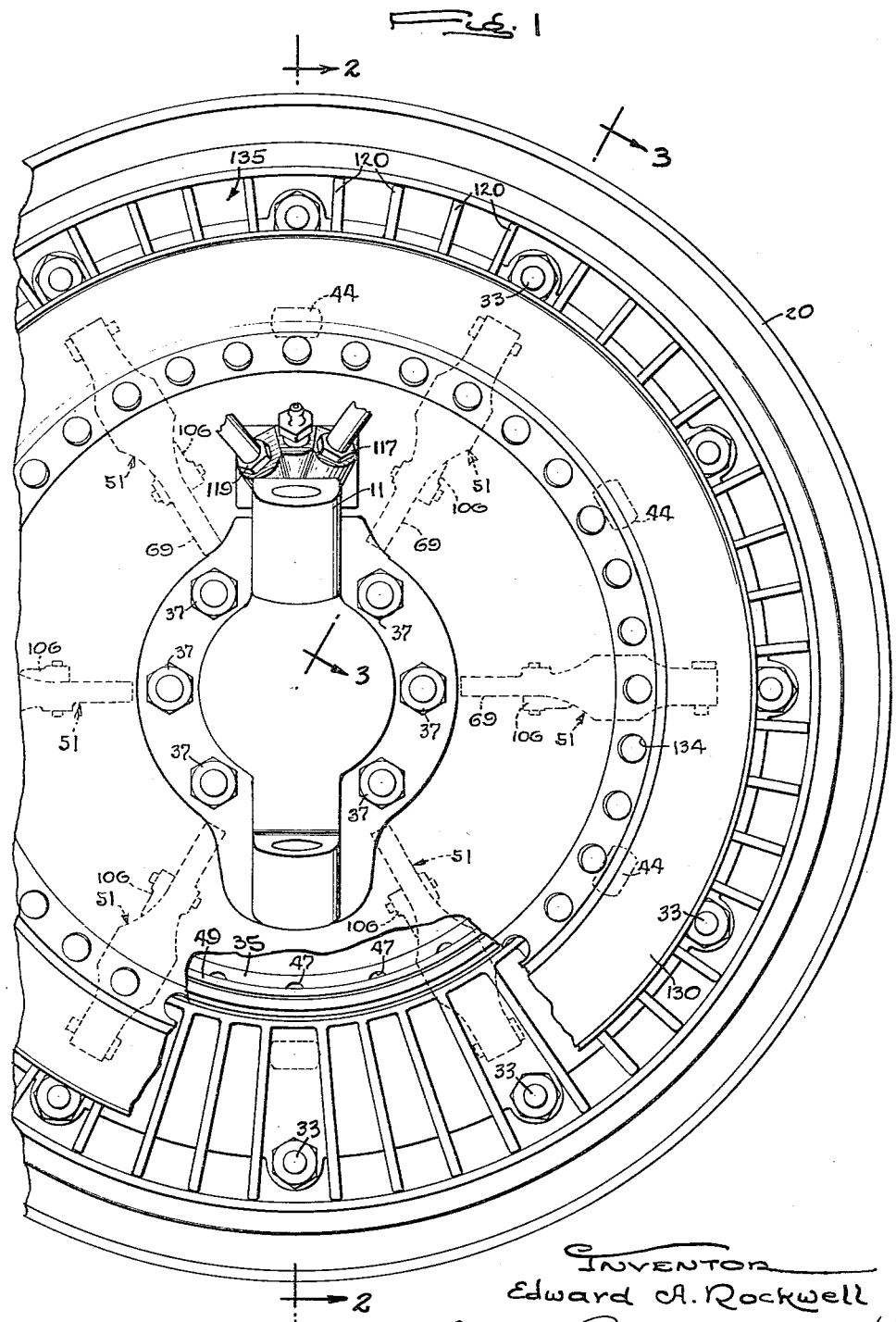
FIGURE 1 is a view in elevation of the inner side of an automobile wheel with a brake embodying the present invention mounted thereon.

While the invention is susceptible of various modifications and alternative constructions, an illustrative embodiment has been shown in the drawings and will be described below in considerable detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

Referring to the drawings, a brake embodying the present invention has been shown applied to the front wheel of an automobile. The front wheel spindle indicated at 10 is integral with the steering knuckle 11 which is adapted to mounting on the automobile front axle in the usual way. Surrounding the spindle 10 is a hub indicated generally at 12 journalled on suitable front wheel bearings 13, 14. The face 15 of the hub is substantially flat and is provided by a locating boss 16 for centered mounting of a wheel 17. The latter is comprised of a wall 18 on which a rim 20 is secured by electrical welds spaced circumferentially. The wheel 17 is fastened to the locating boss on the hub by a circle of nuts 19 threaded on studs 21.

The wheel structure provides an annular cavity totally contained within the confines of the wheel rim and the wall 18. The present brake mechanism is constructed not only to provide maximum efficiency, but is also of such a configuration as to be housed within the annular cavity.

Telescoped inside the rim and around the hub is a brake housing 30, which is fastened to and rotates with the wheel. The brake housing 30 has a pair of shell-like parts 31, 32 each of dished form, secured together at their periphery by a series of spaced nuts and bolts 33 and mounted on the hub by means of the studs 21 which are employed for supporting the wheel on the hub. For this purpose the end half 31 of the brake housing disposed against the locating boss 16 has a circumferential series of openings 34 so that the studs pass through the boss and the housing wall. The opposite or inner housing section 32 being supported by means of the series of nuts and bolts 33 on the periphery of the housing, extends radially inwardly toward the hub 12 terminating in a flange spaced from the hub, leaving an opening within which the brake backing plate 36 is supported by the steering knuckle 11. This backing plate 36 is fastened on the steering knuckle by means of lugs and nuts 37.

In the presence instance the brake housing 30 fastened to the wheel 17 presents inwardly facing opposed flat braking surfaces 38 of annular form provided by machined rings or disks fastened inside the opposite halves of the housing.

Associated with the braking surfaces provided inside the housing and straddled by the same are a pair of complementary pressure plates in the form of flat disks 39, 40 associated together as part of a braking unit 41 and having brake lining segments 42 facing the corresponding braking surfaces of the housing for coaction therewith.

In keeping with the present invention, the pressure plates or disks 39, 40 are drawn together by heavy coil springs 43 so as to hold rollers 44 carried by the primary pressure plate 39 against V-ramps 45 (FIG. 5) formed in the facing surface of the secondary pressure plate 40. Further in keeping with the invention, the braking unit 41 floats between the facing braking surfaces presented by the housing walls, and for this purpose is slidably mounted on the brake backing plate 36. The slidable mounting is provided by ball splines formed by balls 46 contained within coincident axial grooves 47 located in the flange 35 around the inside of the inner brake disk 40 and a flange 48 formed around the backing plate 36. A retainer ring 49 holds the rollers captive in the grooves. With this construction, the inner disk 40 which has been termed the secondary disk, is held by the ball splines against rotation but may move axially upon energization of the brake. The primary or energizing disk 39 is carried by the secondary disk so as to be rotatable relative thereto by means of the rollers 44 and V-ramps 45.

When the brakes are applied, braking action is initiated by moving the braking unit to the left (FIG. 2) and engaging the primary or energizing disk 40 with the corresponding braking surface 38 of the housing. Contact between the energizing disk 40 and the braking surface is produced without separating the brake disks from the minimum spacing of the de-energized position (FIG. 2). Upon the primary or energizing brake disk 40 being engaged with its corresponding braking surface 38 the braking force which results from such engagement is utilized for energizing the braking unit by moving the disks 39, 40 apart and the secondary disk 40 into engagement with the corresponding braking surface 38 on the housing. This is achieved by rotation of the primary disk 39 due to the braking force thus generated. The rotary movement of the primary disk 39 rolls the rollers 44 up the V-ramps 45 on the opposite disk 41, forcing the pressure plates apart and into engagement with the faces of the brake housing.

Thus the braking action is initiated by axially moving the complementary brake disks 39, 40 without disturbing the initial minimum spacing, so as to engage the primary disk 39. Opposing this movement is a relatively light return coil spring 50 which acts against the inner ends of a series of actuating levers 51 for the brake disks. Attention is invited to the fact that to initiate braking actions it is only necessary to overcome the force of the light return spring 50. Thus the brakes may be applied with relatively light treadle pressure. Upon rotary braking force being developed by engagement of the primary disk 39 this force is used to urge the disks apart, frictionally engaging both disks 39, 40 with the corresponding braking surfaces 38, by a power servo or self-energizing braking action. With the present arrangement, in the de-energized position, the disks 39, 40 are held in alinement with the rollers resting in the deep portions of the grooves. On the other hand, when braking engagement is caused between the primary disk 39 and the braking surface 38 in the housing, the drag on the primary disk resulting therefrom produces limited peripheral movement of the primary disk relative to the secondary disk, with the rollers riding up the sloping V-ramp surfaces on the secondary disk.

For actuation of the braking mechanism, in accordance with the invention the backing plate 36 supports dual annular hydraulic cylinders 55, 56 for service and emergency brake operation. The mounting is provided on the backing plate by a relatively thick axially projecting intermediate section of circular form in which the concentric annular hydraulic cylinders 55, 56 are formed for receiving annular pistons 57, 58, which are connected to the braking unit. In the present instance both cylinders are connected by lines 59, 60 (FIG. 2) to a manifold 61 carried by the brake backing plate 36 and accessible behind the wheel 17. The outer annular hydraulic cylinder 56 is adapted for operating the brake for parking or emergency and this may be connected to a hand or foot operated parking brake master cylinder (not shown). The inner annular brake cylinder 55 is adapted for connection to a treadle operated master cylinder (not shown) for service operation of the brakes, and the common manifold 61 allows for simultaneous bleeding of the lines connected to the master cylinders and the wheel cylinders.

Movement of the annular pistons 57, 58 is transmitted to the braking unit 41 by means of a set of levers 51 pivotally mounted at one end on the braking unit 41 and at their free ends contacted by the annular pistons.

In accordance with an important aspect of the present invention, the force exerted by the pistons in the annular hydraulic cylinders 55, 56 is initially effective to move the braking unit 41 so as to engage the primary disk 39. Once the primary disk has been brought into engagement with the braking surface 38 inside the housing, further force exerted by the pistons in the annular hydraulic cylinders 55, 56 is divided by the levers 51 into separate components. One component of force is applied to the primary disk 39, holding it engaged and increasing the braking pressure. The other component of force is transmitted to the secondary disk tending to apply the same. In carrying out the foregoing, the levers 51 are spaced at equal intervals about the braking unit so as to be operated simultaneously by either the service or emergency hydraulic cylinders 55, 56. As shown in FIGURE 1, there may be six of such levers 65. For obtaining the proportioning of forces, the levers 51 are mounted at one end 67 for pivotal movement axially on the inner face of the secondary brake disk 40. A series of lugs 66 projecting from the face of the secondary brake disk 40, each pinned to the ends of the levers which are bifurcated, support the levers. The free ends 69 of the proportioning levers have a straight portion (FIG. 7) arranged adjacent the leading edges of the annular brake pistons 57, 58. As shown in FIGS. 3 and 7, substantially at the median point of each lever 51, it is slotted to carry a friction reducing roller 71 which engages a flat surface 74 on the inner face of the primary disk. With this arrangement the levers 51 partake of action of levers of both the first and second class. Thus, force is transmitted to the primary disk by the friction reducing roller 71, while force is transmitted at the pivotally mounted end 69 of the levers to the secondary disk 40.

An important feature of the invention resides in the mounting arrangement for the braking unit 41 whereby braking action may be initiated independently of and without extending the heavy pull-back springs 43 drawing the primary 39 and secondary 40 brake disks together. The braking unit is located between the housing braking surfaces 38 by the return spring 50 the force of which opposes movement of the braking unit 41 by the hydraulic brake cylinders. As shown in FIG. 3, for example, this return spring 50 is located between an inwardly turned lip 77 on the backing plate 36 and a sleeve-like retainer 78 for the spring which has a radially extending flange 79 abutting the lower ends of the proportioning levers 51. This light return spring 50 is effective to return the braking unit 41 after operation by either the service brake piston 57 or the parking brake piston 58, and in the preferred arrangement shown, constitutes the sole spring force yieldingly opposing movement of the braking unit until the primary brake disk engages the cooperating braking surface. The force exerted by the return spring should be only slightly more than the force acting on the service piston 57 due to residual pressure in the lines leading to the master cylinder, so as to return the service piston without maintaining a large force on the braking unit 41.

While the return spring 50 is used for returning the service brake piston 57 against the residual pressure, in keeping with the invention the parking or emergency cylinder piston 58 is returned independently of the braking unit 41 by means of a series of tension springs 80 anchored at one end 81 to the backing plate 36 and fastened at the other end 82 to a ring 83 contacting a shoulder 84 presented around the outside edge of the annular piston 58. The emergency piston 58 is normally spaced from the ends of the actuating levers 51, as shown in FIG. 3, for example. When fluid under pressure is conveyed to the emergency brake cylinder 56, so as to cause the piston 58 therein to be actuated, the ring 83 is carried with the piston until the pressure is released whereupon the springs 80 attached to the ring return the piston. Independently, the heavy springs between the disks pull the latter together and the return spring draws the braking unit to its stop position.

Turning now to a detailed consideration of the braking unit 41, it will be seen from reference to FIGURES 1, 2, 4 and 5 that the inner face of the secondary disk 40 is machined with a series of V-ramps 45 for the rollers 44 mounted on the primary disk 39. The rollers 44 are supported by radially extending pins 90 mounted on bosses 91 located opposite the V-ramps. For stability and alinement purposes a peripheral wall or skirt 92 is formed adjacent the V-ramps, so located that the pins 90 supporting the rollers abut against the inside of the skirt, and allowing the rollers to rest in the V-ramps.

To recapitulate the operation of the braking unit, whether the brakes are applied by means of the service or emergency brake cylinders 55, 56, the primary 39 and secondary 40 brake disks move axially in the same direction as a unit 41 without stretching the heavy pull-back springs 43, and against the force only of the relatively light return springs 50, until the lining segments 42 on the primary brake disk engage the braking surface 38 on the inside of the housing. When the wheel and housing are rotating, upon such contact between the lining segments on the primary brake disk which being mounted on the hub 12 is not rotating, and the braking surface 38, a frictional drag is produced which, exerted on the primary brake disk 39, causes the same to rotate a limited angular extent. This latter action causes the secondary disk to be engaged, the rollers 44 supported by the primary disk riding up the camming ramps 45 on the inner face of the secondary disk, producing a camming force axially of the braking unit urging the plate members apart, which movement is opposed by the force of the relatively heavy return springs 43. Once the primary braking members are engaged and produce the self-energizing force urging the disks apart, further manual force applied by either of the wheel cylinder pistons to the proportioning levers 51 rocks the levers in a clockwise direction about their pivotal ends 67. As an incident to such pivotal movement a component of the manual force which is applied to the free end 69 of the levers by one of the annular pistons is transmitted to the primary brake disk by means of the roller connection 71 at the median point of the lever to the said primary disk. Similarly, a reactive force at the pivot 67 imparts a component of the force applied by the manual actuated piston to the lever, to the secondary brake disk 40 which force acts in the same direction as the energizing force urging the latter disk into engagement with the corresponding braking surface 38. The angle of the camming ramps 45 and the amount of rotational force due to braking determines the magnitude of the self-energizing force produced. To limit the likelihood of the brakes locking due to pyramiding of the force of self-energization, the camming angle and the springs 43 are selected such that under ordinary braking surface conditions the energizing force produced is insufficient to overcome the force drawing the disks together and due to these springs. It will thus be appreciated that the proportioning levers 51 which operate simultaneously under the actuation of the annular brake cylinders, are effective to divide the manual force into components, and a portion of the same is supplied to each brake disk in a brake engaging direction. Once braking action has been initiated, the application of additional manual force, for example, by continued depression of the treadle, is required to further engage the brake disks in conjunction with the force due to the self-energizing action. Thus throughout the entire braking operation direct control over the operation of the secondary as well as the primary disk is afforded by the follow-through connection provided by the said proportioning levers.

The ratio between the forces applied to the primary and secondary disks 39, 40 via the proportioning levers 51 is determined by the lengths of the effective lever arms: (1) the over-all length of the lever 51, i.e., the distance from the point of contact where the brake cylinder pistons engage the free end 69 of the lever 51 and the pivotal axis at the other end 67 of the lever; (2) the distance between the point of application of force to the free end 69 of the lever 51 and the roller 71 which contacts the primary disk 39.

While it may be desired to change this ratio, with the lever lengths as shown in the drawings braking force applied to the proportioning levers 51 is boosted at a ratio of about 2:1 for application to the primary disk 39. The follow-through force applied to the secondary disk 40, which is in the same direction as the force due to the self-energizing action of the disks, is about equal to the actuating force. It will be evident the forces applied both to the primary and secondary disks are applied as an incident to pivotal movement of the levers 51, except during the initial period of actuation when the brake pistons slide the braking unit 41 against the force of the return spring 50 so as to engage the primary disks 39.

In the present instance, the brake-released position of the braking unit 41 is determined by the retracted position of the proportioning levers 51 which are drawn when the brake linings are new by the return coil spring 50 against a stop surface 93 presented by the brake backing plate 36. As shown in FIG. 3, with new brake linings, the position of the braking unit 41 is substantially equally spaced from the braking surfaces 38. After a period of use of the brakes, producing a reduction in thickness of the brake linings, in the absence of compensation, the clearance between the primary disk and the corresponding braking surface increases, requiring further treadle travel to actuate the braking unit. In the interest of maintaining a short range pedal, in according with the present invention, automatic adjustment is provided for altering the brake released position of the disks, (1) so that the clearance between the primary disk and its braking surface remains substantially constant, and (2) so that the total pivotal movement of the proportioning levers 51, and the movement of the brake piston 57 or 58, to produce the latter, is maintained substantially constant. As shown in FIG. 8, after wear has reduced the thickness of the braking linings, the braking unit 41 is so positioned in the brake released position that the linings of the secondary disk 40 contact the braking surface inside the housing, dragging slightly. The position of the primary brake disk relative to the secondary disk, in other words the spacing between the disks, in the released position of the braking unit 41, is determined by the angular position of the proportioning levers 51. However the clearance between the linings on the primary disk 39, and its braking surface has remained about the same.

It is important that the primary disk 39 be maintained at an adequate minimum clearance to insure that the brake does not remain cammed on in the released position. However slight contact between the secondary disk 40 and its braking surface 38, since there is little or no force applied normal to the braking surfaces, results in negligible drag. As also shown in FIG. 2, the return spring 50 acting on the levers 51 always tends to draw the braking unit toward the inner braking surface 38 adjacent disk 40.

In carrying out the foregoing, an automatic adjuster mechanism 95 is employed in conjunction with each proportioning lever 51. This adjuster mechanism comprises a stop rod 96 which is slidable within an inclined cylindrical bore 97 within the proportioning lever, the stop rod having a head 98 with an oblique surface 99 which abuts against the flat inner face 101 of the secondary brake disk and directly spaces the primary and secondary disks in the released position of the braking unit. The lower end of the stop rod 96 has a series of adjacent peripheral locking grooves 103 which function in the present construction as detents receiving a pawl in the form of a spring steel clip 104 which is riveted or fastened by means of machine screws to the free end of the proportioning lever. For cooperation with the adjustable stop rod there is provided an auxiliary adjusting lever 106 which is pivotally mounted on a shaft 107 carried by the proportioning lever. One end of the auxiliary lever 106 contacts the end of the adjustable stop rod 96 while the opposite camming end engages an angularly inclined cam surface 108 provided by a cup 110 supported by the brake backing plate. The camming end of the auxiliary lever 106 slides over the cam surface as the braking unit moves in the direction of application of the same and is normally held against the surface by the light spring 111. Due to the angle of the cam surface 108, as wear reduces the thickness of the linings the auxiliary lever 106 is caused to pivot clockwise and pushes the stop rod 96 through the lever when the brake is operated so that the head protrudes. Retrograde movement of the rod is prevented by the detents. Of course, this action is gradual, occurring as it does coincident with the reduction in thickness of the linings. The stop rods 96 are thus effective for spacing the disks when the brake is released as shown in FIG. 8 to maintain the same released position clearance of the primary brake disk, in other words, a substantially constant running clearance between the lining and housing surface, regardless of lining wear.

Accordingly, in the operation of the braking mechanism, with either new or worn brake linings, as shown in FIGS. 3, 6 and 8 the braking unit 41 is initially moved to the left until engagement is effected between the linings on the primary brake disk and the corresponding braking surface. The auxiliary levers 106 are drawn along the inclined camming surface during initial movement of the braking unit, pivoting clockwise as they do so. The position of the auxiliary levers 106 at this stage is not indicated in the drawings but would be intermediate the "off" position shown in FIG. 3 and the "on" position of FIG. 6. The force of self-energization produced as a consequence of pressure of the primary disk against its braking surface, moves the secondary disk toward the right and as an incident thereto since the pivotally supported ends of the levers 51 move to the right, the proportioning levers pivot clockwise. This latter draws the auxiliary levers 106 further along the inclined camming surface provided by the cup 110. The auxiliary lever 106 is shown at this stage in FIG. 6. The slope of the camming surface is such that with new linings the auxiliary lever 106 pivots clockwise a total amount that brings the positioning end of the lever into contact without exerting sufficient force to move the stop rod 96 as shown in FIG. 6. Thus with new brake linings, the slope of the camming surface is such that the oblique surface 99 on the head 98 of the stop rod 96 will maintain the position shown in FIGS. 3 and 6 flush with the back of the proportioning lever 51. As brake lining wear occurs and the disks are separated to a greater extent in order to engage both brake disks, a greater pivotal movement of the proportioning levers 51 is required in order to effect such engagement. Such a greater pivotal movement causes the camming end of the auxiliary lever 106 to ride further down the camming surface provided by the stamped cup 110, pivoting the auxiliary lever to a progressively greater extent as brake lining wear continues. As wear reduces the thickness of the linings, the end of the auxiliary lever 106 contacts the adjusting rod 96 forcing it from the proportioning lever to, for example, the position shown in FIG. 8.

It will be noted that pivotal movement of the proportioning levers 51, as occurs during operation of the braking mechanism, swings the median sections of the levers away from engagement with the corresponding secondary brake disks. Thus the adjusting rods may be caused to project from the proportioning levers as shown in FIG. 8, without resistance.

Referring in detail to another feature of the invention, for the purpose of actuating the proportioning levers 51 of the braking unit 41, dual annular hydraulic cylinders 55, 56 are provided which are concentrically arranged with respect to the wheel spindle. In the present instance, the concentric cylinders are defined by the lateral walls of a groove channeled out of a forwardly projecting thick section in the backing plate 36. A cylindrical ring 113 divides the groove into the two cylinders 55, 56, the ring 113 being fastened in an axial slot 115 in the backing plate 36. Thus the concentric annular cylinders 55, 56 provide dual hydraulic means for actuating the brakes, and in the present instance the cylinders may be connected as described before, for service application and emergency application of the brakes. In such an arrangement, the manifold 61 on the backing plate 36 provides a fitting 117 for connection of the service cylinder 55 to a master cylinder operated by the brake treadle. In a similar way, the emergency cylinder 56 may be connected by means of a fitting 119 on the manifold 61 to a master cylinder controlled by a hand or foot operated emergency brake lever. With a system as illustrated, emergency brake operation may be provided for all four vehicle wheels in both forward and reverse direction of operation of the vehicle. Thus the system provides, for example, an emergency brake system for control of the vehicle on steep grades in case of failure of the service brake system, which contributes additional safety. Since the emergency braking depends upon the same brake mechanism for operation as the service braking, the disadvantages inherent in systems involving mechanical or independent hydraulic methods of brake actuation for emergency use have been eliminated.

The concentric annular hydraulic cylinders 55, 56 for service and emergency operation are relatively small in cross section and produce a limited force for application to the proportioning levers. As has been explained, it is an important feature of this invention that the force derived from the cylinders 55, 56 should be applied in a predetermined proportion to the braking disks. It has been found that smoother operation of the brake mechanism is obtained when this force is divided unequally between the brake disks. The latter is achieved due to the different effective lengths of the lever arms, through which arms the force applied by the braking cylinders is effective on the primary and secondary disks. It will be recalled that the boost ratio is about 2:1 and this same ratio applies between the force applied to the primary disk as compared to the secondary disk. The force due to power derived from the hub after braking action has been initiated, is equally applied to both the primary and secondary discs since the power or self-energizing force is applied to urge to disks apart. It is desirable to have the manual force component acting on the primary brake disk as large as possible in order to increase the effectiveness of that force as a control over the operation of the primary disk, and to insure instantaneous release of the primary brake disk by the heavy pull-back springs when the brake treadle is released so as to prevent pyramiding of the force due to energization and locking of the brakes. Under this arrangement, however, there is also a direct follow-through connection by virtue of the proportional levers to the secondary disk, which enhances the "feel" the operator has when applying and releasing the brakes.

Focussing attention on the anti-friction mounting for the braking unit 41, provided by the balls 46 and grooves 47 forming a spline, the freedom that it has to move axially is important since this reduces the force necessary to be overcome in applying the brake. It also is significant in achieving the result that both brake disks 39, 40 produce substantially the same braking action, insuring that any wear takes place equally on the different brake linings. Furthermore, no axial braking force is transmitted to the hub, thus insuring minimum loading on the wheel bearings.

A further aspect of the invention is the provision of forced air cooling of the braking surfaces, to assure long lining life. In carrying out this aspect of the invention, the brake housing 30 which is fastened to rotate with the wheel 18, is provided on its periphery with closely spaced radially extending fins or blades 120. The housing sections 31, 32 may be die-cast aluminium while the braking surfaces inside the housing may be provided by ferrous alloy rings 38, to provide a light weight construction and good heat transfer characteristics. The fins 120 are formed as part of the housing section castings and extend radially inwardly along the outer surface of the left or outer housing half 31. An annular shield or shroud 121 made of sheet material completely encircling the housing and having an inwardly extending wall 122, abuts against the outer edges of the fins and is positioned within the rim of the wheel 17. A resilient ring 123 of rubber or the like is used to prevent rattling. It is contemplated that the wheel 17 will have a series of openings 124 to allow cooling air to be drawn through the wheel. The inwardly extending wall 122 of the shield insures that the cooling air drawn through the wheel passes across the full radial extent of the housing 30 adjacent the braking surfaces 38, as shown by the arrows in FIG. 2. The cooling air is divided into parallel streams by the closely spaced fins 120.

The fins 120 around the periphery of the brake housing (FIG. 2) rotating with the wheel 17, operate as blades of a centrifugal blower and draw air radially outwardly not only along the wheel side of the brake housing but also along the inner side of the housing. A disk-like shield 130 is mounted adjacent the inner side of the brake housing on the backing plate 36, so as to be fixed against rotation. This latter shield 130 covers the end of the ball splines. It thus helps to prevent the entrance of dirt and other foreign materials such as water or mud thrown up from the road into the brake mechanism. A ring of small openings 134 in the shield 130 provides an inlet for cooling air on the inner side of the housing and this cooling air is drawn by the action of the blades 120 over the outer housing wall as shown by the arrows in FIG. 2, cooling the latter. The cooling air is confined in channels between the fins 120 on the radial surface and is expelled axially adjacent the periphery of the brake housing through an annular opening defined by the outer circular edge of the disk-like shield 130. Thus the housing halves are cooled by forcing large volumes of air over the parts subject to heating during the application of the brake, and from the shroud 121 via the annular opening 135.

Attention is invited to the arrangement which with forced air cooling as just described provides cooling yet permits minimum clearance between the brake housing and the inside of the rims of the wheel. This is the result of a more efficient utilization of the cooling air by channeling its flow over the surfaces to be cooled. By reducing the clearance between the brake housing and rim it is possible to provide larger brake disks and thus larger areas of braking surface. The general arrangement of the components of the brake further contributes in achieving this latter result, since it may be observed that the location of the proportioning levers between the disks affords a more efficient utilization of the available space and allows the use of larger brake disks than commonly afforded by disk brakes for the same size wheel.

The anti-friction mounting for the disks provides a tight, rattle-free arrangement, and enhances the precision with which the base mechanism operates. The primary brake disk 39 also opreates smoothly as part of the braking unit, being mounted on the secondary disk for relative movement by virtue of the balls and V-ramps which center the primary disk about the spindle and which hub, and within the brake housing. Also assisting in achieving this latter result is the arrangement of the brake levers 51 in bearing engagement with the sloping surfaces 74 inside the primary disk. The inclination of the surface 74 automatically centers the primary disk 39 relative to the secondary disk 40 on which it is carried, and lends stability to the braking unit.

As a feature of the invention, it was mentioned earlier, the manifold 61 provides for simultaneously bleeding the brake lines of the dual hydraulic system. For this purpose, the manifold 61 provides a single bleeder screw 62 movably mounted on a bore 62'. The screw is shown closed in FIG. 2 by being seated at its tip 63 to cut-off communication between the passage 59 which extends to one end of the bore 62 from the service cylinder 55, and a bleed passage 64 extending through the screw. By reference to FIG. 9, it will be seen that the bleed passage 64 leads to a port 64' in the shank of the screw and opens to the bore 62', and has a nipple 68 over which the end of a length of hose may be connected for the bleeding operation. An O ring 70 seals off the passage 60 leading to the emergency cylinder 56, from the bleed passage 64, while another O ring 70' prevents leakage of fluid past the head of the screw.

By unscrewing the bleed screw 62 so as to unseat the tip 63, the service cylinder passage 59 is placed in communication with the bleed passage 64, to allow bleeding the service brake line. By unscrewing the bleed screw 64 further, so as to withdraw the port 64' and the emergency cylinder passage 60, both the service and emergency lines are placed in communication with the bleed passage 64 allowing bleeding of the same simultaneously. Thus, the bleeding operation for both lines of the dual system can be performed conveniently and with large savings in time. Around the hub and inside the brake housing 30, a circular oil shield 72 is fixedly mounted. This shield, which is sealed with the brake housing wall at the lip 72' of the shield, prevents leakage of oil from the bearing cup around the spindle into the brake housing and onto the brake disks. Passages 73 allow escape of oil behind the shield 72.

I claim as my invention:

1. In a brake mechanism the combination comprising, a rotary wheel to be braked having a hub, a brake housing mounted on said wheel having an annular braking surface concentric with the hub, a braking unit for the wheel mounted on the hub inside the housing including a brake disk axially movable into engagement with the housing braking surface, and manually operated hydraulic means for moving said disk into frictional engagement with said braking surface, said hydraulic means including dual concentric annular cylinders defined about said hub, annular pistons in said cylinders, and connections between said pistons and said brake disk so that pressure fluid admitted to either of said cylinders is effective to move said brake disk axially into contact with the braking surface.

2. In a brake mechanism for vehicles or the like having a frame, a rotary wheel mounted on the frame having a spindle, an annular braking unit for the rotary wheel, anti-friction means for supporting said braking unit concentrically of the spindle and for axial movement thereon, said braking unit having coaxially mounted, separable, brake disks, said rotary wheel having spaced braking surfaces straddling said braking unit and facing said brake disks for coaction therewith respectively, one of said brake disks being mounted for limited rotational movement about the spindle and another of said brake disks being slidably supported solely for axial movement on the spindle by said anti-friction means, a series of heavy springs drawing said brake disks together to a brake-released position, manually operated means for slidably moving said braking unit on said spindle without stretching said heavy springs and without separating said brake disks so as to engage one disk and its braking surface producing a braking force tending to rotate the braking unit, and an energizing device between said disks including means for camming them apart from the brake released position stretching said heavy springs in response to said braking force so as to frictionally engage another disk.

3. In a brake mechanism for vehicles or the like having a frame, a rotary wheel to be braked having a hub, said frame including a plate fixed against angular movement and having a cylindrical flange coaxial with the wheel and hub, a braking unit for the wheel movably mounted on the plate including primary and secondary brake disks, said secondary disk having a cylindrical flange concentric with the plate flange, a brake housing enclosing the braking unit and defining braking surfaces straddling and engageable with said brake disks respectively, anti-friction bearing means for mounting said braking unit for movement relative to the plate including facing straight grooves in the flanges, balls in the straight grooves, said grooves and balls forming a spline limiting said secondary brake disk solely to movement axially of the hub, said braking unit being movable to initially frictionally engage the primary brake disk with one braking surface in the housing causing a braking force tending to rotate the primary disk, and an energizing device between said disks comprising cam means so arranged that said braking force moves the secondary disk axially of the hub so as to frictionally engage the other braking surface in the housing.

4. In a brake mechanism for vehicles or the like, a rotary wheel to be braked having a spindle, a braking unit for the wheel movably mounted on the spindle comprising primary and secondary brake disks, a brake housing carried by said rotary wheel and defining braking surfaces facing the brake disks respectively for coaction therewith, a brake cylinder having a pressure fluid operated piston therein for operating said braking unit, a proportioning lever pivotally mounted at one point of connection on one of said disks to abut the other disk at a different point of connection, said piston being connected to said lever at another point so that force applied to said lever by said piston is effective to pivot the lever, and as an incident thereto, to divide the said force between the respective disks; the spacing of the points of connection with relation to each other and to the pivot determining the ratio of division of the force; the force applied to said primary disk being effective to frictionally engage the latter with the corresponding braking surface producing a braking force tending to rotate the braking unit, said braking unit including an energizing device having means for translating said braking force into a force acting in the same direction as the force due to the lever for moving the secondary disk into frictional engagement with the corresponding braking surface in the housing.

5. In a brake mechanism for vehicles or the like having a spindle, a rotary wheel mounted on the spindle and having a hub, a braking unit for the wheel movably mounted on the hub and connected to the spindle so as to be held against rotation with the hub, comprising a pair of annular brake members, a brake housing carried by said rotary wheel having braking surfaces facing the brake disks respectively of said braking unit for coaction therewith, manually operated hydraulic means mounted on the spindle for operating said braking unit, said hydraulic means including selectively operable concentric annular cylinders each having annular pistons, proportioning means operably connecting said hydraulic means and the braking unit, said proportioning means including a lever pivotally mounted on one of said disks to abut the other disk, said annular pistons being connected to said lever so that manual force applied by either of said pistons is effective to pivot the lever, is divided into components and applied to respective disks in brake engaging directions, the initial application of force to said proportioning means being effective to move said braking unit relative to the hub so as to engage one of the disks and the corresponding braking surface producing a braking force tending to rotate the unit, said braking unit including an energizing device connected to the other disk and having means for translating said braking force into a force applied to the latter disk in the same direction as the component of manual force applied by the proportioning lever.

6. In a brake mechanism for vehicles or the like having a frame, a rotary wheel mounted on the frame and having a spindle, a braking unit for the wheel movably mounted on the spindle and connected to the frame so as to be held against rotation with the hub, comprising a pair of complementary brake members, a brake housing carried by said rotary wheel and defining braking surfaces facing the brake members respectively for coaction therewith, manually operated hydraulic means mounted on the frame for operating said braking unit, said hydraulic means including an annular cylinder in the spindle having an annular piston, a proportioning lever pivotably mounted at one point of connection on one of said disks to abut the other disk at a different point of connection, said piston being connected to said lever at another point so that force applied to said lever by said piston is effective to pivot the lever, and as an incident thereto, both to divide the said force between the respective disks and to apply the components of said force in brake engaging directions, the spacing of the points of connection with relation to each other and to the pivot determining the ratio of division, anti-friction bearing means mounting the braking unit such that the initial application of force to said lever is effective to move said braking unit relative to the hub causing frictional engagement of one of the members with the corresponding braking surface and a braking force tending to rotate the braking unit, said braking unit including an energizing device connected to the other disk and having means for translating said braking force into a self-energizing force applied in the same direction as the component of force acting on the other disk due to the lever and urging the same into frictional engagement with the corresponding braking surface inside the housing.

7. In a brake mechanism for vehicles or the like having a rotary wheel to be braked, said wheel having a hub, a brake unit for the wheel mounted on the hub, separate hydraulic systems for operation of said brake unit, each system including individual brake cylinders connected to the unit, and brake lines leading to said cylinders, a manifold for said cylinders and mounted on vehicle having separate conduits leading to said cylinders and brake lines of said systems respectively, and means for selectively bleeding brake fluid from said separate hydraulic systems including a single bleeder member movably carried by said manifold and having a bleed passage connected with one of said conduits of one of said separate systems in one position of said member and with one of said conduits of a second of said separate systems in a second position of said member, said bleeder member having a third position in which said bleed passage is closed from communication with all of said systems.

8. In a brake mechanism for vehicles or the like having a rotary wheel to be braked, said wheel having a hub, a brake unit for the wheel mounted on the hub, separate hydraulic means for operation of said brake unit including individual brake cylinders connected to the unit, a manifold for said cylinders and mounted on the vehicle having first and second conduits leading to said cylinders and connectible to the brake lines, a bore in said manifold having outlets to both said conduits respectively, the first of said outlets being at one end of the bore and the second being spaced therefrom, a bleed screw movably mounted in the bore having a bleed passage leading to a port in the screw opening to the bore, between said outlets, said bleed screw having a portion normally seated on a seat at said one end of the bore for closing off communication between the first outlet and the port and another portion intermediate and normally sealing off the port and the second passage, and means for moving said bleed screw in a direction to unseat said bleed screw to allow communication for bleeding the first conduit and the brake line connected thereto, and to shift the other portion to allow communication for bleeding the second conduit and the brake line connected thereto simultaneously with the first.

9. In a brake mechanism for vehicles or the like, a rotary wheel to be braked having a hub, an annular braking unit for the rotary wheel axially movable on the hub from a released to an operative position and comprising a pair of brake disks, a lever connected to said disks for operating the latter, hydraulically operated means for actuating said braking unit including annular brake cylinders concentric with the hub having annular pistons abutting said lever for moving the same and the braking unit from the released to the operating position, one of said pistons being provided for service operation and the other being provided for emergency operation of the braking unit, a return spring acting against said lever and service piston to return the same from the operative to the released position, and an independent return spring connected to the emergency piston opposing movement of the latter piston responsive to fluid pressure admitted to the emergency cylinder and effective to return the same independently of the lever and braking unit upon release of fluid pressure.

10. In a brake mechanism, the combination comprising, a rotary wheel to be braked having a hub, a brake housing mounted on said wheel having an annular braking surface concentric with the hub, a braking unit for the wheel movably mounted on the hub inside the housing including a brake disk movable into engagement with the housing braking surface, and first spring means opposing movement of said brake disk into engagement with said braking surface; manually operated hydraulic means for moving said disk against the force of said first spring means into engagement with said braking surface, said hydraulic means including dual concentric annular cylinders defined about said hub, annular pistons in said cylinders, connections between said pistons and said brake disk so that pressure fluid admitted to either of said cylinders is effective to move said brake disk into contact with said braking surface, and second spring means opposing movement of one only of said annular cylinders and biasing the latter to a normally off position.

11. In a brake, a rotary member to be braked having a hub, a braking unit for the member, comprising a pair of separable brake disks with one of said disks mounted for limited axial and rotational movement and with the other disk mounted for limited axial movement, means for mounting said braking unit on said hub for axial movement, said rotary member having spaced braking surfaces straddling said braking unit and facing said brake disks respectively for coaction therewith, a series of heavy return springs for drawing said disks toward each other, a return device providing a force lighter than said heavy springs biasing the braking unit axially toward a released position, manually operated means for moving said braking unit axially relative to the hub against the force exerted by said return device without separating said brake disks and without stretching said heavy springs so as to frictionally engage said one of said disks and the corresponding braking surface thereby producing a braking force tending to rotate the frictionally engaged disk, and energizing means between said disks effective upon rotation of the latter disk to separate the disks thereby stretching said heavy springs causing braking engagement between the other disk and the corresponding braking surface.

12. In a brake mechanism for vehicles, a rotary wheel to be braked having a hub, a braking unit for the wheel comprising a pair of separable brake disks mounted back-to-back and presenting braking surfaces on opposite sides with one of said disks mounted for limited axial and rotational movement and with the other disk mounted for limited axial movement, means for mounting said braking unit including both disks on said hub for axial movement, said rotary wheel having a brake housing defining spaced braking surfaces straddling said braking unit and facing said brake disks respectively for coaction therewith, a series of heavy return springs for drawing said disks toward each other, manually operated means for moving said braking unit axially relative to the hub without separating said brake disks and without stretching said heavy springs so as to frictionally engage said one of said disks and the corresponding braking surface thereby producing a braking force tending to rotate said one disk of said braking unit, adjustable means between said brake disks for fixing the initial spacing of the latter when drawn together by said return springs, and cam means between said disks responsive to said braking force for separating the disks thereby stretching said heavy springs causing braking engagement between the other disk and the corresponding braking surface.

13. In a brake mechanism for vehicles or the like, a rotary wheel to be braked having a spindle, a brake unit for the wheel, means for mounting said braking unit on the spindle for axial movement from an initial brake-released position, a relatively light return spring connected to said unit so as to oppose such axial movement, said braking unit comprising a pair of coaxially arranged axially separable brake disks with one of said disks mounted for limited axial and rotational movement and with the other disk mounted for limited axial movement, said rotary wheel having a brake housing defining spaced braking surfaces straddling said braking unit and facing said brake disks, a series of heavier springs than said light spring for drawing said disks toward each other, manually operated means for moving said braking unit axially on the spindle against the force of said light spring without separating said brake disks so as to frictionally engage said one of said disks and the corresponding braking surface without stretching the heavy springs, said engagement producing a braking force tending to rotate the one disk, and an energizing device between said disks and operated responsive to said one disk rotation to cam the disks apart in opposition to the force of said heavier springs causing frictional engagement between the other disks and the corresponding braking surface, said manually operated means including a connection to both said disks such that continued operation of said manually operated means applies brake engaging force supplementing said camming action.

14. For use in a brake mechanism for vehicles or the like having a rotary wheel to be braked, said wheel having a hub, a brake unit for the wheel mounted on the hub, separate hydraulic means for operation of said brake unit including individual brake cylinders connected to the unit, a manifold for said cylinders and mounted on the vehicle having first and second conduits leading to said cylinders and connectible to the brake lines, a bore in said manifold having a threaded portion, said bore also having outlets to both said conduits respectively, the first of said outlets being at one end of the bore and the second being spaced therefrom by an intermediate section of said bore having a smaller diameter than said threaded portion; a single bleeder screw for selectively bleeding brake fluid from said separate hydraulic means, said screw having a head, a shank adjacent the head having a threaded portion for threading the bleeder screw into the manifold bore, a valve portion with a smaller diameter than said shank extending from the latter and sized to be slidably received in said intermediate section of said bore, a longitudinal bleed passage opening through said head of said bleeder screw and extending through said shank and valve portions thereof, a port in the valve portion of the screw and connected to said longitudinal bleed passage, and a circumferential seal carried by said valve portion of the screw between said port and the shank, said bleeder screw having two positions for bleeding the separate hydraulic lines: (1) a first position with said circumferential seal in sealing relation with said intermediate section of the bore and with said port in fluid communication with the first bore outlet to bleed one of said hydraulic means, and (2) a second position with said bleeder screw partially retracted to free said circumferential seal from sealing relation with said intermediate section of the bore to place said port in fluid communication with the second bore outlet to bleed another of said hydraulic means.

15. In a brake mechanism for vehicles or the like, a rotary wheel to be braked having a spindle, a braking unit for the wheel comprising a pair of separable brake disks with one of said disks mounted for limited axial and rotational movement and with the other disk mounted for limited axial movement, means for mounting said braking unit including said brake disks on the spindle for axial movement, said rotary wheel having spaced braking surfaces straddling said braking unit and facing said brake disks respectively, a series of heavy return springs for drawing said disks toward each other, manually operated means for moving said braking unit axially on the spindle without separating said brake disks and without stretching said heavy springs so as to engage said one of said disks and its braking surface, said engagement producing a frictional braking force tending to rotate the latter disk, cam means for mounting said latter disk for limited rotational movement relative to the other disk in response to said braking force and for moving the other disk axially into braking engagement with its braking surface, said cam means comprising rollers on the said one disk coacting with sloping cam surfaces on the other disk for camming the disks apart thereby stretching said heavy springs as an incident to the occurrence of said rotational movement.

16. In a brake mechanism for vehicles or the like, a rotary member to be braked having a spindle, a braking unit for the rotary member, comprising a pair of relatively rotatable disks initially spaced axially apart a fixed distance with one of said disks mounted for limited axial and rotational movement and with the other disk mounted for limited axial movement, means for adjusting the initial spacing of said disks, said rotary member having spaced braking surfaces straddling said braking unit for coaction with the disks respectively, means for mounting said braking unit including said pair of disks on said spindle for axial movement, manually operated means for moving said braking unit axially relative to the spindle without increasing the spacing of the disks so as to frictionally engage said one of said disks and its braking surface producing a braking force tending to rotate the braking unit, and an energizing device between said disks including cam means for translating said braking force into a force camming the disks apart from the initial spacing so as to cause frictional engagement between the other disk and its braking surface.

17. In a brake mechanism for vehicles or the like, a rotary wheel to be braked having a spindle, a braking unit for the wheel, comprising a pair of axially spaced brake disks with one of said disks mounted for limited axial and rotational movement and with the other disk mounted for limited axial movement, means for mounting said braking unit including said disks on said spindle for axial movement, a brake housing carried by the wheel so as to enclose the braking unit and defining braking surfaces facing the brake disks respectively, manually operated means connected to both said disks for operating said braking unit by moving the same without separating said disks so as to frictionally engage said one of the disks and the corresponding braking surface producing a braking force tending to rotate the braking unit, said braking unit including an energizing device having means for translating said braking force into a force engaging the other disk with the corresponding braking surface, said manually operated means including means for dividing manual force applied to operate the unit between the respective disks.

References Cited in the file of this patent

UNITED STATES PATENTS

| | | |
|---|---|---|
| 2,195,558 | Bowen | Apr. 2, 1940 |
| 2,242,049 | Ash | May 13, 1941 |
| 2,256,725 | Pierce et al. | Sept. 23, 1941 |
| 2,262,709 | Lambert | Nov. 11, 1941 |
| 2,375,854 | Lambert | May 15, 1945 |
| 2,732,036 | Myers | Jan. 24, 1956 |
| 2,732,042 | Lucker | Jan. 24, 1956 |
| 2,758,677 | Klaue | Aug. 14, 1956 |
| 2,765,883 | Chayne | Oct. 9, 1956 |
| 2,858,912 | Griswold | Nov. 4, 1958 |
| 2,868,335 | Panhard | Jan. 13, 1959 |
| 2,888,101 | Bayles | May 26, 1959 |
| 2,888,103 | Armstrong | May 26, 1959 |

FOREIGN PATENTS

| | | |
|---|---|---|
| 893,970 | France | Mar. 6, 1944 |
| 1,011,243 | France | Apr. 2, 1952 |